US010028554B2

(12) United States Patent
Haas et al.

(10) Patent No.: US 10,028,554 B2
(45) Date of Patent: Jul. 24, 2018

(54) BELT BUCKLE AND METHOD FOR MOUNTING A BELT BUCKLE

(71) Applicant: TRW Automotive GmbH, Alfdorf (DE)

(72) Inventors: Peter Haas, Eschach (DE); Andrea Schuech, Schwaebisch Gmuend (DE)

(73) Assignee: TRW AUTOMOTIVE GmbH (DE)

( * ) Notice: Subject to any disclaimer, the term of this patent is extended or adjusted under 35 U.S.C. 154(b) by 293 days.

(21) Appl. No.: 14/769,826

(22) PCT Filed: Mar. 4, 2014

(86) PCT No.: PCT/EP2014/000543
§ 371 (c)(1),
(2) Date: Aug. 24, 2015

(87) PCT Pub. No.: WO2014/135264
PCT Pub. Date: Sep. 12, 2014

(65) Prior Publication Data
US 2016/0007690 A1 Jan. 14, 2016

(30) Foreign Application Priority Data

Mar. 8, 2013 (DE) ........................ 10 2013 003 978

(51) Int. Cl.
*A44B 11/25* (2006.01)
*B60R 22/18* (2006.01)

(52) U.S. Cl.
CPC ...... *A44B 11/2546* (2013.01); *A44B 11/2515* (2013.01); *B60R 22/18* (2013.01); *B60R 2022/1806* (2013.01)

(58) Field of Classification Search
CPC . A44B 11/2546; A44B 11/2515; B60R 22/18; B60R 2022/1806
See application file for complete search history.

(56) References Cited

U.S. PATENT DOCUMENTS

| | | | | |
|---|---|---|---|---|
| 8,402,617 | B2* | 3/2013 | Wang | A44B 11/2523 24/629 |
| 9,463,734 | B2* | 10/2016 | Salter | G02B 6/0096 |
| 9,655,411 | B2* | 5/2017 | Ha | A44B 11/2511 |

(Continued)

FOREIGN PATENT DOCUMENTS

| | | | |
|---|---|---|---|
| DE | 102008036605 | 2/2010 | |
| DE | 202012012254 U1 * | 2/2013 | ......... A44B 11/2546 |
| WO | 2011/052414 | 5/2011 | |

*Primary Examiner* — Robert Sandy
*Assistant Examiner* — Matthew J Sullivan
(74) *Attorney, Agent, or Firm* — Tarolli, Sundheim, Covell & Tummino LLP

(57) ABSTRACT

A belt buckle for a seat belt system having a support member (12) including a belt buckle mechanism, first and second shells (16, 18) which together encompass the support member (12) and an annular cover member (14) surrounding an end face of the support member (12). Along the periphery of the annular cover member (14) at feast a first structure (24) is formed and in the area of a rim (28) of the first and second shells (16, 18) directed to the annular cover member (14) a respective second structure (26) is formed. The first and second structures (24, 26) are engaged with each other and fix the first and second shells (16, 18) to the annular cover member (14).

10 Claims, 4 Drawing Sheets

(56) References Cited

U.S. PATENT DOCUMENTS

| | | | |
|---|---|---|---|
| 2009/0078811 A1* | 3/2009 | Dick | B60R 22/18 |
| | | | 242/397 |
| 2014/0109349 A1* | 4/2014 | Blank | A44B 11/2546 |
| | | | 24/164 |
| 2015/0296928 A1* | 10/2015 | Krauss | A44B 11/2546 |
| | | | 362/549 |
| 2016/0242511 A1* | 8/2016 | Mangold | A44B 11/2546 |
| 2017/0172261 A1* | 6/2017 | Engel | B60R 22/00 |

* cited by examiner

BELT BUCKLE AND METHOD FOR MOUNTING A BELT BUCKLE

RELATED APPLICATIONS

This application corresponds to PCT/EP2014/000543, filed Mar. 4, 2014, which claims the benefit of German Application No. 10 2013 003 978.9, filed Mar. 8, 2013, the subject matter, of which are incorporated herein by reference in their entirety.

BACKGROUND OF THE INVENTION

The invention relates to a belt buckle for a seat belt system as well as a method of mounting a belt buckle.

In a belt buckle usually a stable support member connected to the belt webbing and including a mechanism for receiving and for releasing the plug-in tongue is surrounded by a lining. Frequently belt buckles having different linings are offered, for example a version having an integrated lighting, different colors or being made of different materials, e.g. adapted to the interior equipment of the specific vehicle.

SUMMARY OF THE INVENTION

It is the object of the invention to present a simple option for mounting a lining to a support member of a belt buckle, wherein the lining moreover permits flexible combination of different lining parts.

In accordance with the invention, in a belt buckle for a seat belt system having a support member including a belt buckle mechanism first and second shells together encompassing the support member and an annular cover member surrounding an end face of the support member are provided for this purpose. Along the periphery of the annular cover member at feast a first structure is formed and in the area of a rim of the first and second shells directed to the annular cover member a respective second structure is formed. The first and second structures are engaged with each other and fix the first and second shells to the annular cover member. In accordance with the invention, the lining is composed of merely three parts, i.e. the two shells and the annular cover member which can be easily assembled.

When the lining parts are provided in different variants, e.g. in different colors and/or materials, they can be combined at will. For example, an annular cover member of the color of the interior lining of the vehicle can be combined with two neutral shells. The tripartition of the lining allows for realizing a plurality of design options in a simple manner.

For example, the first and second shells and/or the annular cover member can be fabricated of different materials and can be installed in different combinations.

The first shell, the second shell and/or the annular cover member are made e.g. at least substantially of polypropylene, acrylonitride-butadiene-styrene and/or polyoxymethylene.

The first and second structures are preferably complementary to each other so that they can engage especially positively with each other.

The first structure can be arranged at the outer or inner periphery of the annular cover member, wherein they are preferably formed directly at the rim of the cover member. The second structure is arranged correspondingly on the inside or outside of the shells so as to be adapted to engage in the first structure.

The first structure is preferably provided to be circumferential about an outer surface of the annular cover member. The second structure preferably extends on the inside along the rim of the end of the first and/or second shell directed to the annular cover member. It is also possible to form the first structure to be circumferential about an inner surface of the annular cover member and to form the second structure outside along the rim of the end of the first and/or second shell directed to the annular cover member.

The second structure preferably extends along the entire inner rim or outer rim of the shells so that the shells are fastened to the annular cover member along the entire length of the rim.

Appropriate structures are, for example, projections and recesses extending in parallel to the circumferential direction which can preferably positively engage with each other. It is also possible to align the projections and recesses in parallel to the axial direction.

One of the two structures, especially the first structure, may include at least one groove and the other structure, especially the second structure, may include at least one tongue. A groove and, resp., tongue circumferential about the periphery of the annular cover member is perfectly suited for being combined with a tongue and, resp., groove arranged along the rim of the shells. The two structures can be made to engage by simple attachment perpendicularly to the axial direction.

Further fastening elements fixing both shells to the annular cover member can be dispensed with. The fixing is preferably performed merely by the engagement of the first and second structures which can be obtained by simply attaching the two shells onto the annular support member.

In order to additionally fix the two shells directly to each other and to tightly interconnect them, preferably plural fastening elements are provided.

The fastening elements are pin-shaped, for example, and are arranged especially in seats in the shells. The two shells can be easily fastened to each other by e.g. two or four fastening elements and advantageously also the support member can be fixed in place.

The seats and thus the fastening elements are preferably arranged in the corners of the substantially square shells so as to obtain optimum load distribution.

The first and second shells can be fastened on the fastening elements by a respective welded, adhesive, screwed, plug-in and/or locking connection. The fastening can be different at the two shells, which is especially advantageous when the fastening elements are first mounted on one of the two shells.

When a belt buckle is mounted according to the invention, the following steps are carried out:
- attaching the annular cover member onto the support member,
- fixing the fastening elements to either of the shells or to the support member,
- attaching either of the shells onto the annular cover member, wherein the second structure at the shell is made to engage in the first structure at the annular cover member,
- attaching the second shell to the annular cover member, wherein the second structure at the shell is made to engage in the first structure at the annular cover member, and
- fixing the fastening elements to the first shell, to the second shell and/or to the support member.

In this way, the lining can be arranged around the support member of the belt buckle by few steps.

The two shell members and the annular cover member can be composed for each belt buckle out of a group of shells and annular cover members of different materials and colors.

The annular cover member can be fixed to the support member by locking, screwing, gluing or welding, for example. It is also possible, however, to initially attach the annular cover member merely to the support member and pre-fix it, where appropriate, and to obtain the final fixation solely by the engagement of the first and second structures which arrest the annular cover member to the shells free from play and via the fastening elements equally free from play to the support member.

For mounting, the shells are preferably attached either perpendicularly to the axial direction of the belt buckle or in the axial direction onto the first structure at the annular cover member, depending on the configuration of the first and second structures and possibly of the fastening elements.

The fixation of the fastening elements to the first shell, the second shell and/or the support member can be accomplished by welding, gluing, screwing, inserting and/or locking, for example.

Final and tight fixation of the fastening elements to the first shell is preferably carried out already before the latter is attached onto the annular cover member.

In a preferred course of the assembly the annular cover member is attached onto the support member and is possibly locked with the same. The fastening elements are tightly and permanently fastened to the first shell, for example by locking, gluing, welding or screwing in seats pre-fabricated at the shell. The free ends of the fastening elements preferably configured as fastening pins advantageously project perpendicularly from the shell so that their free ends can be fastened at the inside of the second shell. Then the first shell is attached onto the annular lining part so that the first and second structures interlock. When the first shell is connected to the annular lining part, the second shell is attached onto the annular lining part and onto the fastening elements. The free ends of the fastening elements are inserted, for example, in matching seats at the inside of the second shell so that exact positioning of the shells relative to each other is ensured. The permanent fixation of the fastening elements to the second shell is advantageously carried out by gluing or locking or any other type of fastening for which no direct access to the inside of the shell and to the fastening element is required.

It would also be imaginable to fix the fastening elements to the support member.

BRIEF DESCRIPTION OF THE DRAWINGS

Hereinafter the invention will be described in detail with reference to the enclosed drawings in which.

DESCRIPTION

Figure 1:
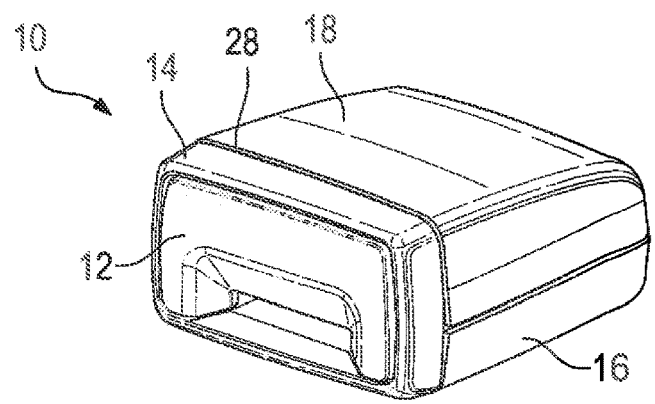
FIG. 1 is a schematic perspective view of a belt buckle according to the invention in accordance with a first embodiment in the fully mounted state.
Figure 2:
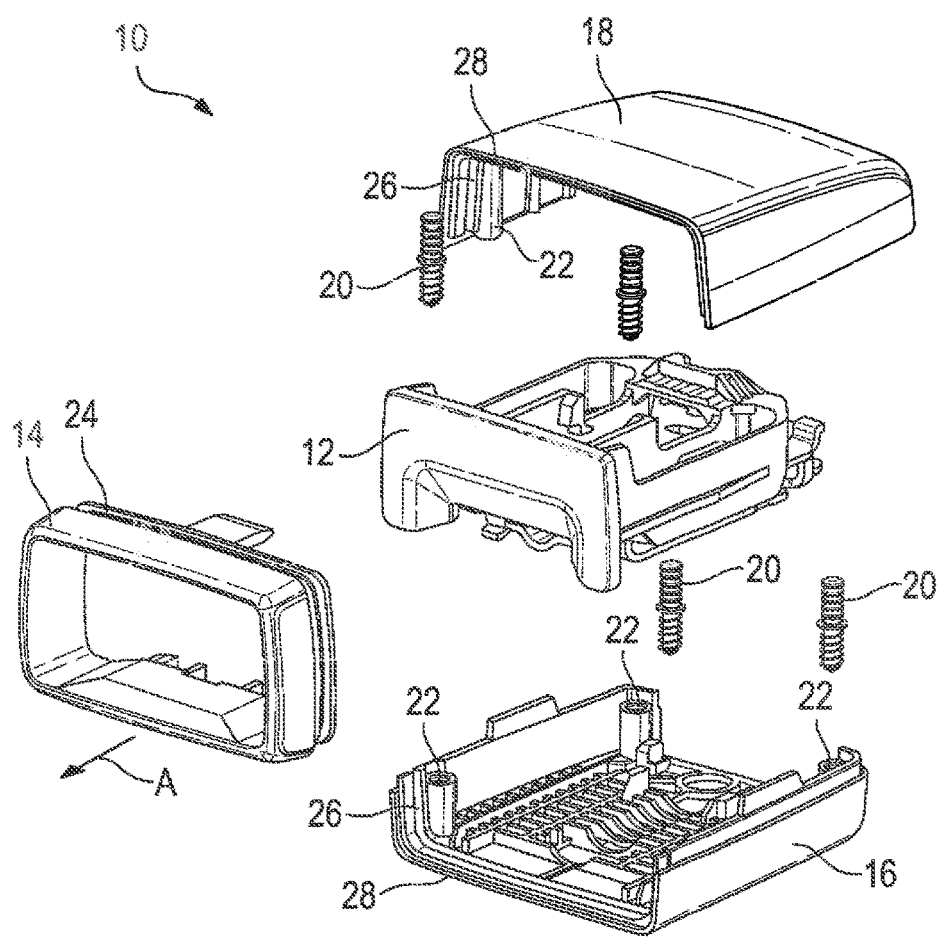
FIG. 2 is an exploded view of the belt buckle from FIG. 1.

FIGS. 1 and 2 illustrate a belt buckle 10 according to the invention in accordance with a first embodiment. In FIG. 1 the belt buckle 10 is shown in the completely mounted state, whereas FIG. 2 illustrates the individual components of the belt buckle 10.

A support member 12 which includes a belt buckle mechanism not described in detail here for receiving and releasing a plug-in tongue as well as means for fastening to a seat belt webbing and which is adapted to be configured in a conventional known way is surrounded by a lining. The lining consists of three separate components, i.e. an annular cover member 14 attached onto the end face of the support member 12 as well as a first shell 16 and a second shell 18 which together encompass the support member 12. The two shells 16, 18 can be at least approximately identical as to their shape.

Plural fastening elements 20, in the present example four fastening pins, interconnect the two shells 16, 18 and the support member 12.

The fastening elements 20 are arranged in the four corners of the shells 16, 18 with the support member 12 in the fully mounted state being located between the fastening elements 20.

The fastening elements 20 have a thread at each of their two free ends and centrally include a stop disk for exact positioning in seats 22 of the shells 16, 18. The seats 22 take a cylindrical shape and are formed Integrally in the corners of the insides of the shells 16, 18. Instead of the thread, also a ring or detent burl contour may be provided.

For fastening the two shells 16, 18 on the annular cover member 14 first and second structures 24, 26 are provided. The first structure 24 is formed on the rim of the annular cover member 14 facing toward the two shells 16, 18 to be circumferential about an outer surface. The second structure 16 is arranged on the inside of the respective dm of the shells 16, 18 facing toward the annular cover member 14 in parallel to the rim.

In the illustrated example, a circumferential groove is formed as the first structure 24 at the annular cover member 14. The second structure 26 is configured to be complementary thereto in the form of a projection extending along the rim 28 which is adjusted as to width and height to the shape of the groove. The projection of the second structure 26 extends along the entire inner rim of each of the shells 16, 18.

It is possible, of course, to exchange the first and second structures 24, 26 and to provide a circumferential projection at the annular cover member 14 and corresponding grooves at the shells 16, 18. It would also be possible to provide plural parallel grooves and projections, resp., instead of only one groove and one projection.

Figure 3:
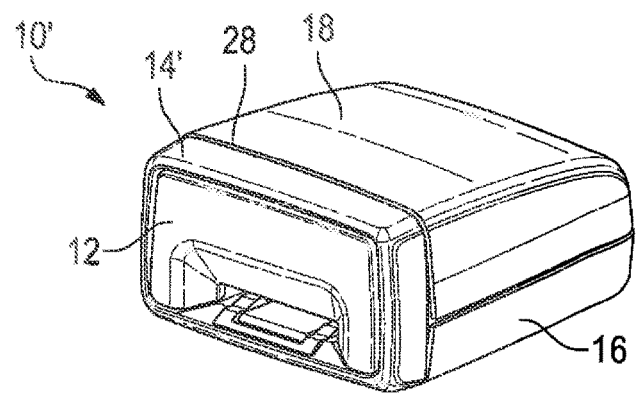
FIG. 3 is a schematic perspective view of a belt buckle according to the invention in accordance with a second embodiment in the completely mounted state.
Figure 4:
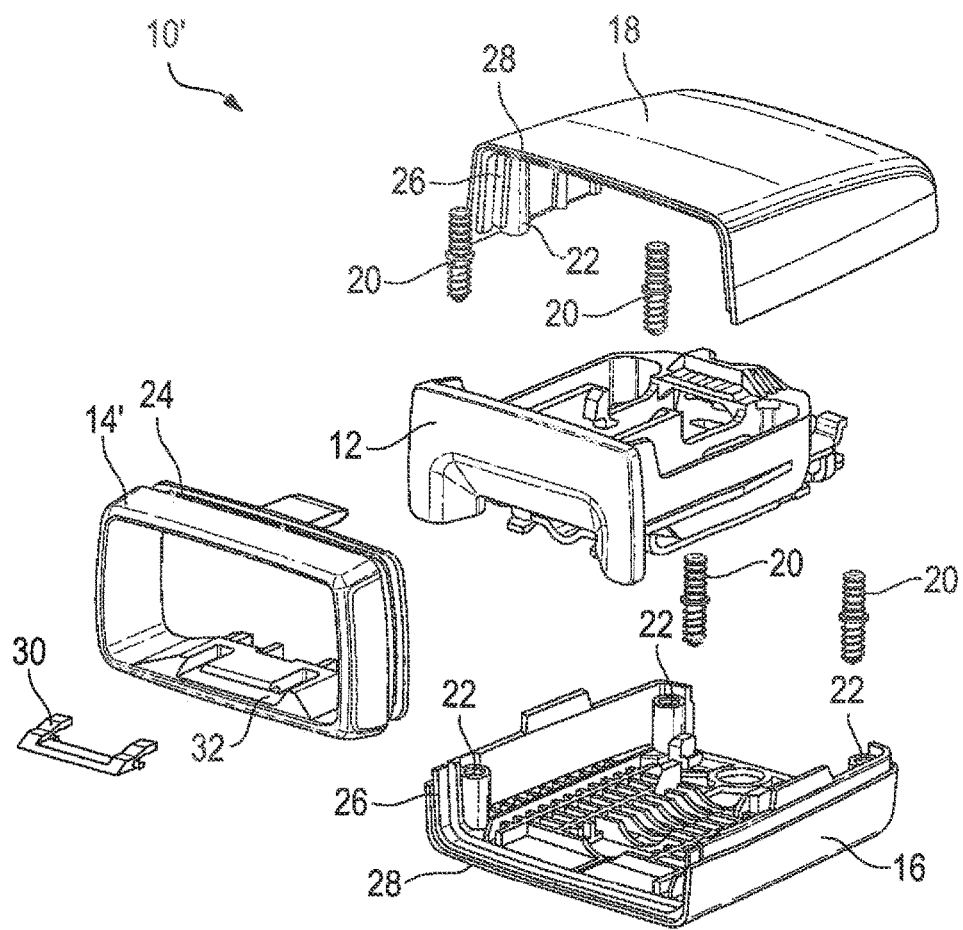
FIG. 4 is an exploded view of the belt buckle from FIG. 3.
Figure 5:
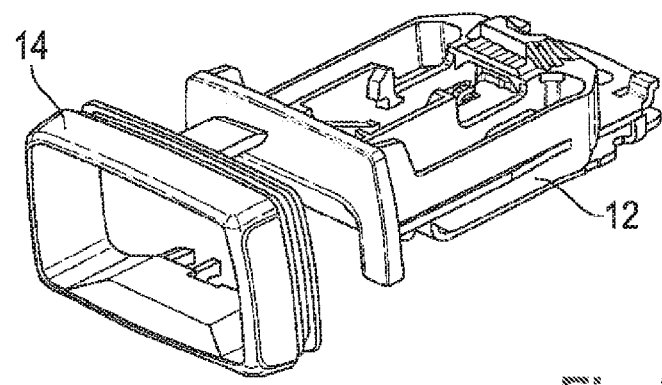
FIG. 5 to 10 show the mounting stops for mounting a belt buckle according to a method of the invention.
Figure 6:
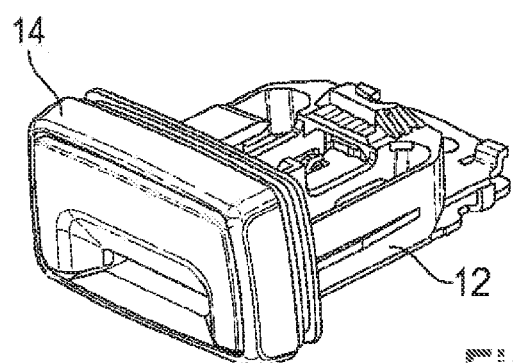
Figure 7:
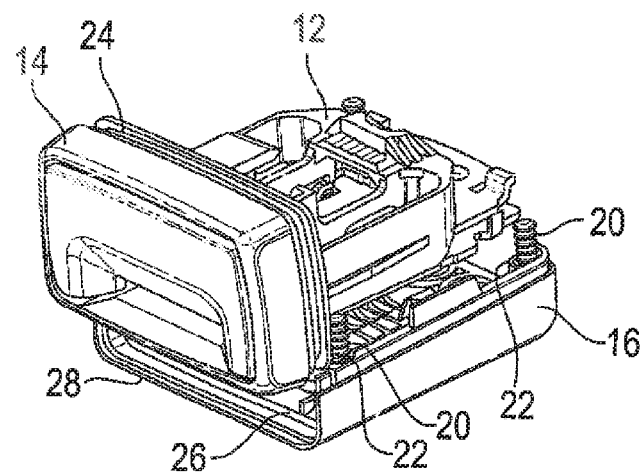
Figure 8:
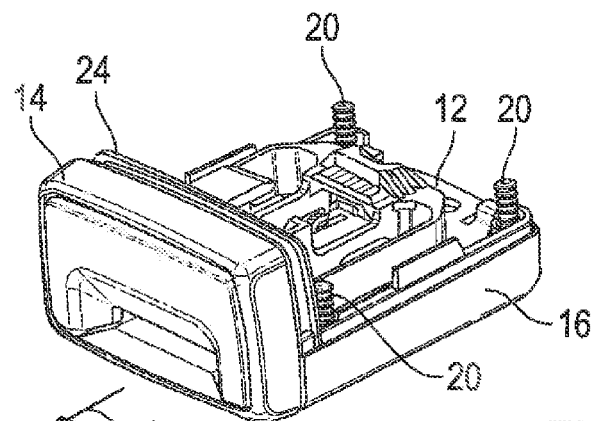

FIGS. 3 and 4 illustrate a second embodiment of a belt buckle 10' according to the invention. The only difference from the afore-described first embodiment resides in the fact that de-rattling means 30 is provided at the annular cover member 14'. The U-shaped spring-biased de-rattling means 30 is inserted in a recess 32 formed at an inner peripheral face of the annular cover member 14'.

In addition to or instead of the de-rattling means 30, also lighting could be integrated in the annular cover member 14', for example.

Said second embodiment shows the high flexibility of design which is achieved by optionally incorporating different annular cover members 14, 14' in the belt buckle 10 and 10', respectively, which can also be configured in different colors and materials, of course. Possible materials are e.g. polypropylene, acrylonitrile-butadiene-styrene and polyoxymethylene.

It is possible to exchange only the annular cover member 14, 14' and to use identical shells 16, 18 in each belt buckle. Equally, also different shells 16, 18 can be utilized so that with an identical shape of the lining parts the outer appearance of the belt buckle 10 can be varied almost at will.

The assembly of the individual components into the finished belt buckle 10, 10' is always carried out in the same way. This shall be described hereinafter with reference to FIGS. 5 to 10.

The annular cover member 14 (or the cover member 14' of the second embodiment including the inserted de-rattling means 30) is attached onto the support member 12 and is tightly fixed or pre-fixed thereto via snap-on connection (not shown), for example. In the sub-assembly obtained in this way the annular cover member 14 surrounds the support member 12 on the end face. It is evident from FIG. 6 that especially a key of the support member 12 and an inserting aperture for the plug-in tongue are surrounded by the annular cover member 14.

The four fastening elements 20 are fixed in the seats 22 of the first shell 16, in the present case by screwing, locking, gluing or welding. A first end of the respective fastening element 20 is introduced into the seat 22 until it contacts the stop disk.

The first shell 16 and the sub-assembly of the support member 12 and the annular cover member 14 are now connected by attaching the shell 16 onto the annular cover member 14 perpendicularly to the axial direction A of the belt buckle in such manner that the first structure 24 and the second structure 26 are positively engaged with each other. In this case, the projection at the inside of the shell 16 is inserted into the groove at the outer periphery of the annular cover member 14 and in this way fixes the first shell 16 on the annular cover member 14 at an exactly predetermined position and free from play.

The support member 12 is now located between the outer walls of the seats 22 of the fastening elements 20 and thus is fixed against movement in the lateral direction.

Finally, the second shell 18 is attached onto the annular cover member 14 analogously to the first shell 16 so that the second structure 26 at the inside of the second shell 18 is engaged with the first structure 24 at the annular cover member 14. In this manner, also the second shell 18 is free from play and is connected to the annular cover member 14 at an exact position.

When attaching the second shell 18, also the free ends of the fastening elements 20 simultaneously engage in the seats 22 at the second shell 18.

The tight and permanent fixation of the fastening elements 20 in the seats 22 of the second shell 18 is effectuated, for example, by locking, gluing or any other type of fastening in which no direct contact with the fastening element 20 is required any more.

Figure 9:
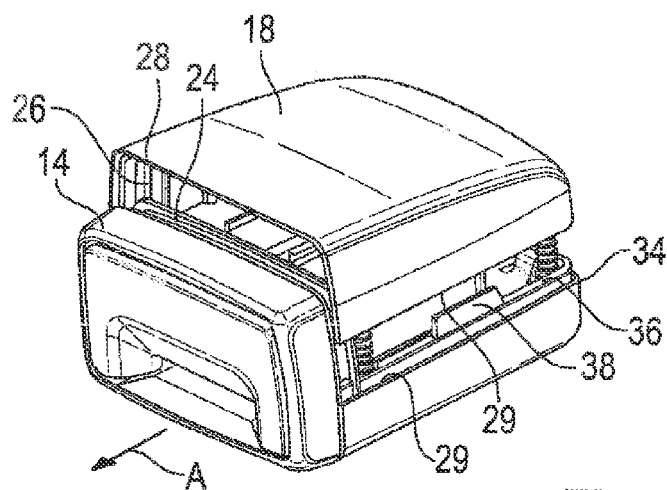
Figure 10:
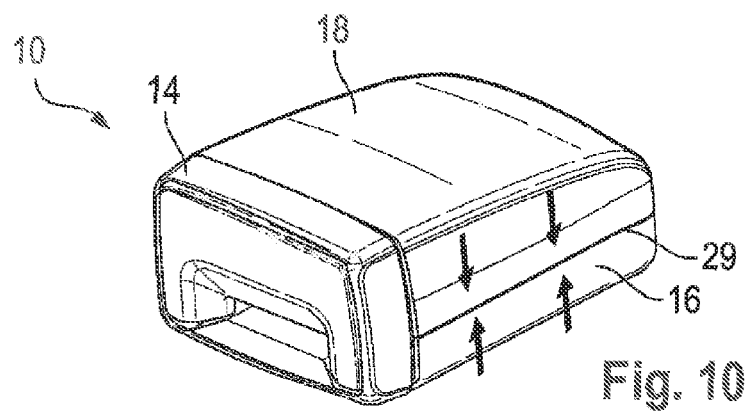

In this example, at its two sides 34 extending in the axial direction A the first shell 16 includes a shoulder 36 offset inwardly vis-à-vis an outer rim 29 as well as a central projection 38 in extension of the shoulder 36 (see FIG. 9). The shoulder 36 extends along the entire length of the shell 16 in the axial direction A. When attaching the second shell 18 onto the annular cover member 14, the shoulder 36 and the projection 38 of the first shell 16 engage behind the side faces 34 of the second shell 18 so that a closed and dust-proof connection is formed, when the outer rims 29 of the two shells 16, 18 are superimposed, as illustrated in FIG. 10.

The invention claimed is:

1. A belt buckle for a seat belt system comprising a support member (12) including a belt buckle mechanism, first and second shells (16, 18) which together encompass the support member (12) and an annular cover member (14; 14') surrounding an end face of the support member (12), wherein at least one first structure (24) is formed along the periphery of the annular cover member (14; 14') and a respective second structure (26) is formed in the area of a rim (28) of the first and second shells (16, 18) directed toward the annular cover member (14; 14'), and wherein the first and second structures (24, 26) are engaged with each other and fix the first and second shells (16, 18) to the annular cover member (14; 14').

2. The belt buckle according to claim 1, wherein the first shell (16), the second shell (18) and/or the annular cover member (14; 14') are made of different materials.

3. The belt buckle according to claim 1, wherein the first shell (16), the second shell (18) and/or the annular cover member (14; 14') are made at least substantially of polypropylene, acrylonitrile-butadiene-styrene and/or polyoxymethylene.

4. The belt buckle according to claim 1, wherein the first structure (24) is formed to be circumferential about an outer surface of the annular cover member (14; 14') and the second structure (26) is formed along an entire inner rim (28) of the end of each of the first and second shells (16, 18) directed to the annular cover member (14; 14').

5. The belt buckle according to claim 1, wherein one of the two structures (24, 26) includes at least one groove and the other structure (26, 24) includes at least one tongue that engages the at least one groove.

6. The belt buckle according to claim 1, wherein plural fastening elements (20) are provided for fixing the two shells (16, 18) to each other.

7. The belt buckle according to claim 6, wherein the fastening elements (20) are pin-shaped and are especially arranged in seats (22) within the shells (16, 18).

8. The belt buckle according to claim 6, wherein each of the first and second shells (16, 18) is fastened to the fastening elements (20) by a welded, adhesive, screwed, plug-in and/or snap-on connection.

9. A method of mounting a belt buckle according to claim 1, comprising the steps of:
attaching the annular cover member (14; 14') onto the support member (12),
fixing the fastening elements (20) to either of the shells (16, 18) or to the support member (12),
attaching one of the shells (16) onto the annular cover member (14; 14'), wherein the second structure (26) at the shell (16) is made to engage with the first structure (24) at the annular cover member (14; 14'),
attaching the second shell (18) onto the annular cover member (14; 14'), wherein the second structure (26) at the shell (18) is made to engage with the first structure (24) at the annular cover member (14; 14'), and
fixing the fastening elements (20) to the first shell (16), to the second shell (18) and/or to the support member (12).

10. The method of mounting a belt buckle according to claim 9, wherein the pre-assembly of the fastening elements (20) on the support member (12) or either of the shells (16, 18) is carried out by welding, gluing, screwing, plugging and/or locking, and/or the fixation of the fastening elements (20) to the first shell (16), to the second shell (18) and/or to the support member (12) is carried out by welding, gluing and/or locking.

* * * * *